(12) United States Patent
Osei-Bosompem (10) Patent No.: US 7,575,258 B1
(45) Date of Patent: Aug. 18, 2009

(54) VEHICLE SALT DISPENSING SYSTEM

(76) Inventor: Margaret Osei-Bosompem, 28 Fitzgerald Dr., Middletown, NY (US) 10940

( * ) Notice: Subject to any disclaimer, the term of this patent is extended or adjusted under 35 U.S.C. 154(b) by 467 days.

(21) Appl. No.: 11/433,714

(22) Filed: May 12, 2006

(51) Int. Cl.
*B60B 39/00* (2006.01)

(52) U.S. Cl. .......................................... 291/2

(58) Field of Classification Search ............ 291/2, 291/25, 26, 38, 41, 44, 46, 47; 222/566
See application file for complete search history.

(56) References Cited

U.S. PATENT DOCUMENTS

| | | | | | |
|---|---|---|---|---|---|
| 1,575,098 | A | * | 3/1926 | Conty | 291/28 |
| 1,755,823 | A | * | 4/1930 | Hopkins | 291/1 |
| 1,832,581 | A | * | 11/1931 | Riley | 291/3 |
| 1,850,795 | A | * | 3/1932 | Hoffmann | 291/3 |
| 3,797,867 | A | * | 3/1974 | Hartl | 291/3 |

* cited by examiner

*Primary Examiner*—Mark T Le (57) ABSTRACT

A vehicle salt dispensing system. An illustrative embodiment of the vehicle salt dispensing system includes a pump and supply module adapted to contain a supply of salt, at least one dispensing tube communicating with the pump and supply module and at least one generally curved discharge tube communicating with the at least one dispensing tube.

14 Claims, 7 Drawing Sheets

VEHICLE SALT DISPENSING SYSTEM

FIELD

The present invention relates to apparatuses for dispensing salt on icy roadways. More particularly, the present invention relates to a vehicle salt dispensing system which is capable of dispensing salt from a vehicle to enhance traction of the vehicle on icy pavement.

BACKGROUND

In cold weather, typically that accompanied by precipitation, ice has a tendency to form on roadways and bridges. Commonly, after the onset of ice formation, salt trucks drop salt on the roadways and bridges to melt the ice and enhance traction of vehicles on the roadways and bridges. In some areas, however, such as in rural areas, for example, salt trucks may be unavailable to salt the roadways and bridges and melt the ice.

SUMMARY

The present invention is generally directed to a vehicle salt dispensing system. An illustrative embodiment of the vehicle salt dispensing system includes a pump and supply module adapted to contain a supply of salt, at least one dispensing tube communicating with the pump and supply module and at least one generally curved discharge tube communicating with the at least one dispensing tube.

BRIEF DESCRIPTION OF THE DRAWINGS

The invention will now be described, by way of example, with reference to the accompanying drawings, in which.

DETAILED DESCRIPTION

Figure 1:
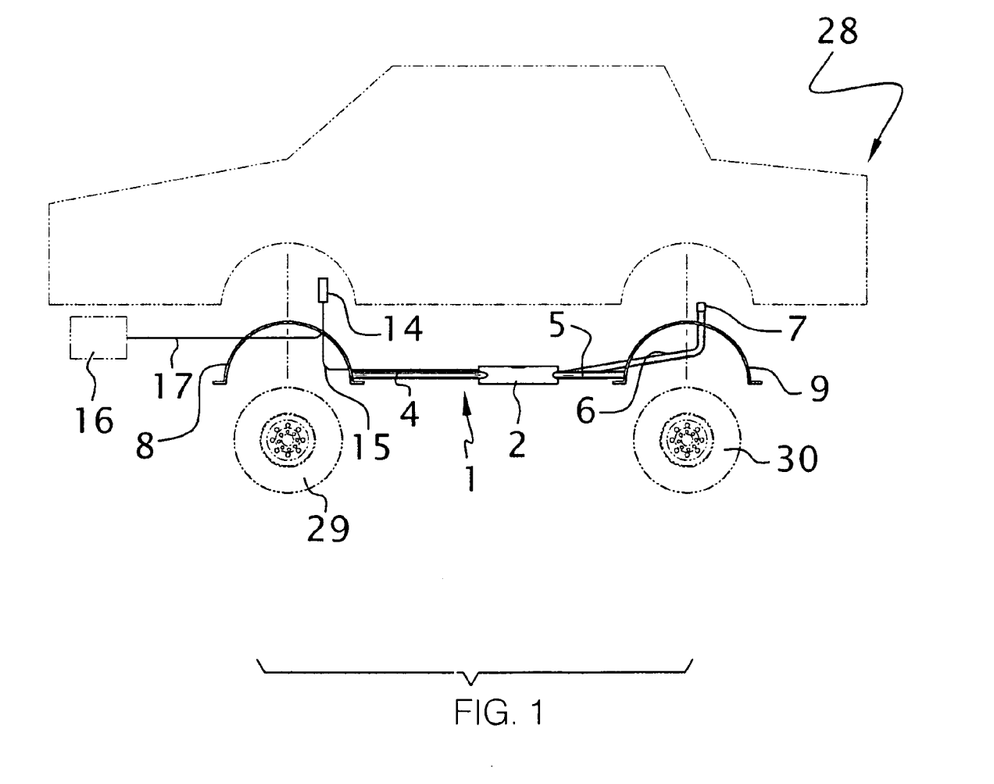
FIG. 1 is a side view of an illustrative embodiment of a vehicle salt dispensing system, more particularly illustrating fitting of the system on a vehicle (shown in phantom)
Figure 2:
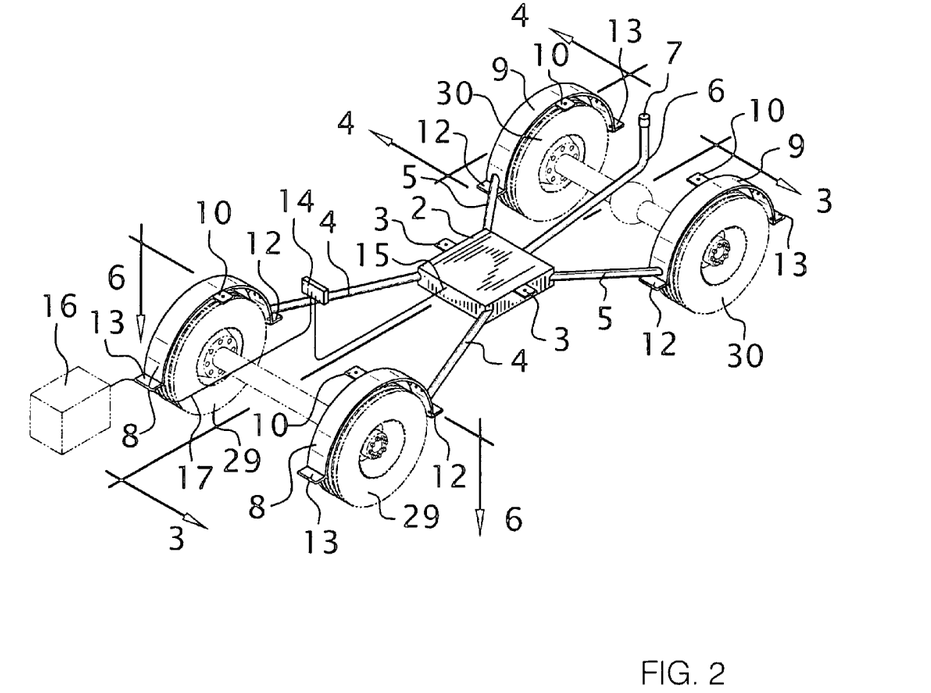
FIG. 2 is a front perspective view of an illustrative embodiment of a vehicle salt dispensing system.
Figure 3:
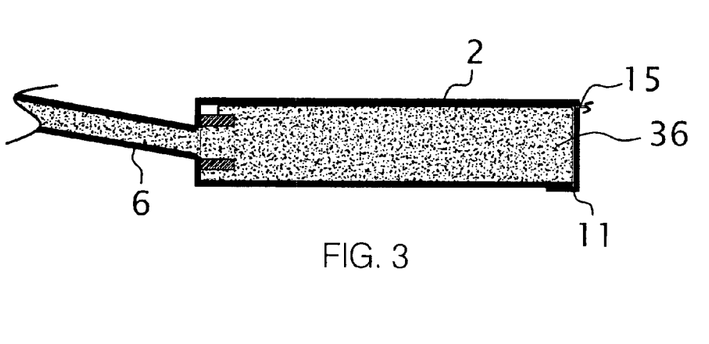
FIG. 3 is a sectional view, taken along section lines 3-3 in FIG. 2, of a pump and supply module element of an illustrative embodiment of a vehicle salt dispensing system.
Figure 4:
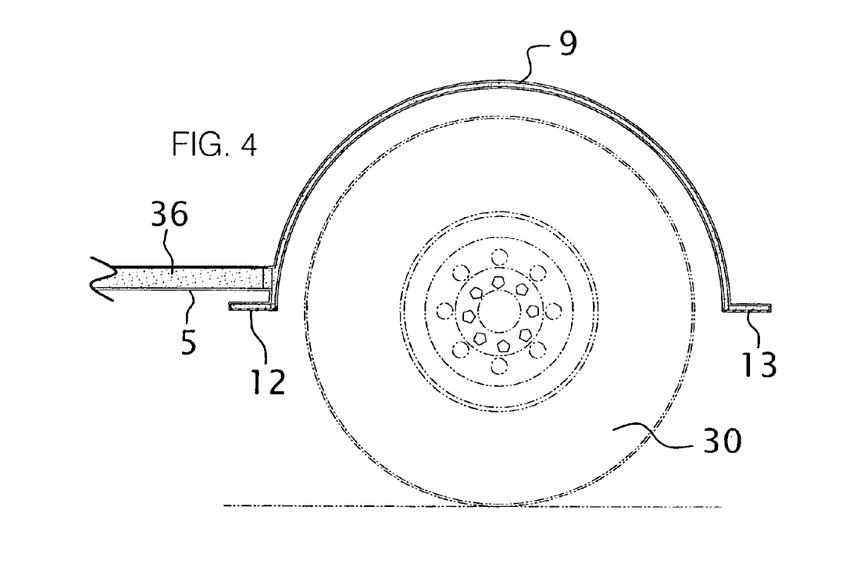
FIG. 4 is a sectional view, taken along section lines 4-4 in FIG. 2, of rear dispensing tube and rear discharge tube elements of an illustrative embodiment of a vehicle salt dispensing system.

Referring initially to FIGS. 1-6 of the drawings, an illustrative embodiment of a vehicle salt dispensing system, hereinafter system, is generally indicated by reference numeral 1. As shown in FIGS. 1 and 2, the system 1 includes a pump and supply module 2 which is adapted to contain a supply of packed salt 36, as shown in FIG. 3, and to pump the salt 36 from the pump and supply module 2, as will be hereinafter described. As shown in FIG. 2, one or multiple mount brackets 3 may be provided on the pump and supply module 2 to facilitate mounting the pump and supply module 2 on the undercarriage of a vehicle 28.

A pair of spaced-apart front dispensing tubes 4 and a pair of spaced-apart rear dispensing tubes 5 extends from the pump and supply module 2. The pump and supply module 2 is adapted to pump the salt 36 from the pump and supply module 2 through the front dispensing tubes 4 and the rear dispensing tubes 5, for purposes which will be hereinafter described. As shown in FIG. 3, an ice sensor 11 may be provided on the pump and supply module 2 to initiate and sustain operation of the pump and supply module 2 in the event that the ice sensor 11 detects the presence of ice on the pump and supply module 2.

A refill tube 6 extends from the pump and supply module 2, such as between the front dispensing tubes 4 or between the rear dispensing tubes 5, as shown. The refill tube 6 is adapted to facilitate refilling of the pump and supply module 2 with salt 36 as the salt 36 is placed in the distal supply end of the refill tube 6. A cap 7 may be provided on the supply end of the refill tube 6 when the pump and supply module 2 is not being filled with salt 36.

Figures 5, 6:
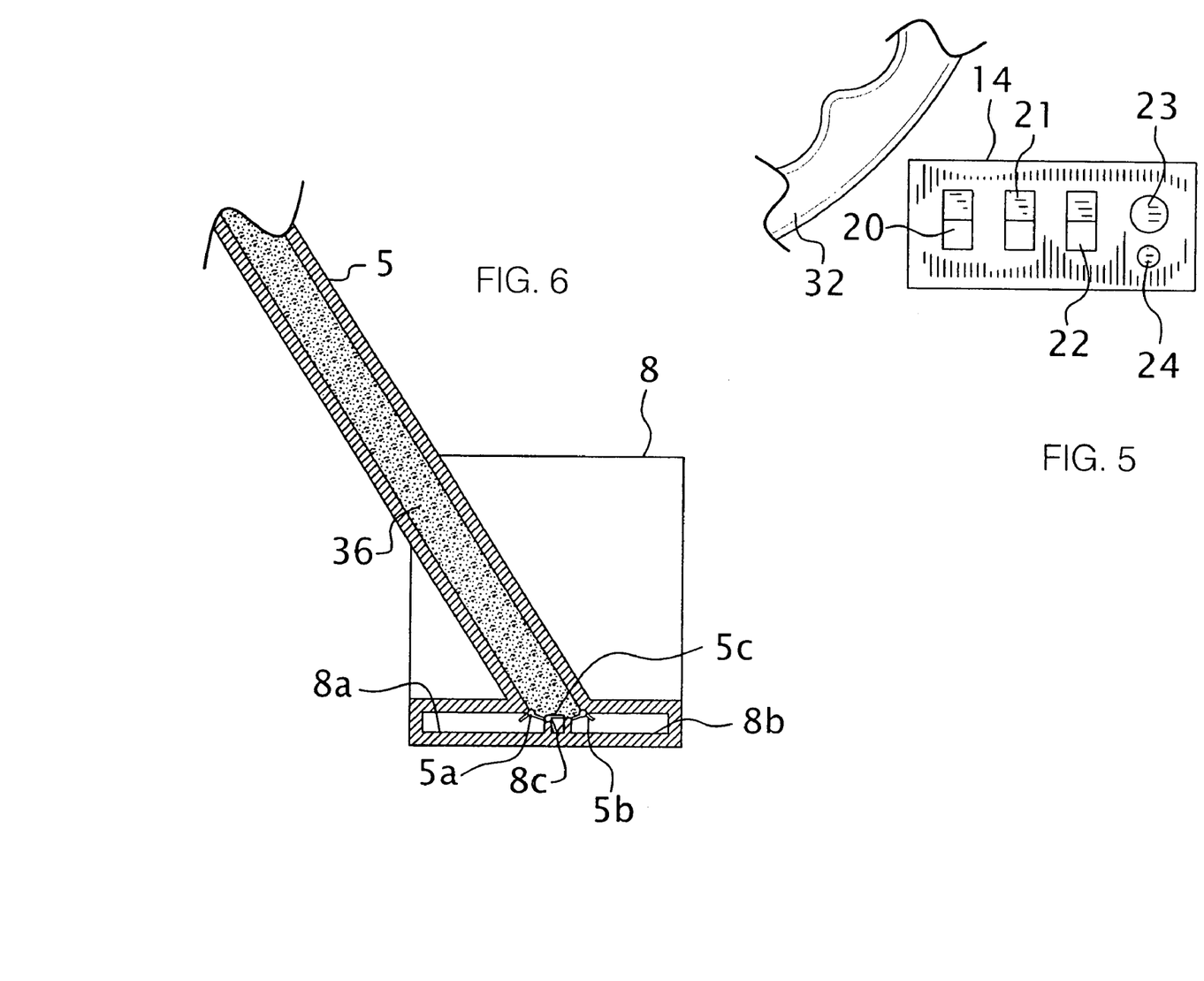
FIG. 5 is a front view of a typical control module of an illustrative embodiment of a vehicle salt dispensing system, mounted in a vehicle (not shown) adjacent to a steering wheel (partially in section)
FIG. 6 is a sectional view, taken along section lines 6-6 in FIG. 2, of a front discharge tube element of an illustrative embodiment of a vehicle salt dispensing system.

A pair of front discharge tubes 8 is connected to the respective front dispensing tubes 4, and a pair of rear discharge tubes 9 is connected to the respective rear dispensing tubes 5. Each front discharge tube 8 may have a flat tubular configuration, for example, and typically has a generally curved or arcuate shape. Each front discharge tube 8 has a proximal end flange 12 which is adjacent to the attachment point of the rear dispensing tube 5 to the front discharge tube 8 and a distal end flange 13 which is spaced-apart from the proximal end flange 12. As shown in FIG. 6, each front discharge tube 4 is partitioned, typically having a normal drive channel 8a, a reverse drive channel 8b and a forward drive channel 8c between the normal drive channel 8a and the reverse drive channel 8b. As shown in FIG. 6, the rear dispensing tube 5 communicates with the normal drive channel 8a, the reverse drive channel 8b and the forward drive channel 8c through a first gate 5a, a second gate 5b and a third gate 5c, respectively.

The normal drive channel 8a has a first set of openings (not shown) which extend through the bottom of the front discharge tube 4, and are spaced-apart with respect to each other throughout the length of substantially the entire front discharge tube 8. The reverse drive channel 8b has a second set of openings (not shown) which extend through the distal end flange 13 of the front discharge tube 4. The forward drive channel 8c has a third set of openings (not shown) which extend through the proximal end flange 12 of the front discharge tube 4. Each rear discharge tube 9 typically has a design which is similar to that of each front discharge tube 8. As shown in FIG. 2, at least one tube mount bracket 10 may be provided on each front discharge tube 8 and each rear discharge tube 9 to facilitate attachment to the undercarriage of the vehicle 28.

As shown in FIGS. 1 and 2, a control module 14 is typically connected to the pump and supply module 2 such as through module wiring 15, for example. A battery 16 is connected to the control module 14 such as through battery wiring 17, for example. The control module 14 may be provided in the cabin (not shown), for example, of the vehicle 28, such as adjacent to the steering wheel 32, for example, as shown in FIG. 5.

The control module 14 is adapted to facilitate operation of the system 1 in any of various modes, as will be hereinafter described. As shown in FIG. 5, the control module 14 may include, for example, a reverse/override switch 20; a normal/override switch 21; a forward/override switch 22; a power switch 23; and an LED 24. The LED 24 is connected to the ice sensor 11 provided on the pump and supply module 2 and is adapted to be illuminated in the event that the ice sensor 11 senses the presence of ice.

As shown in FIGS. 1 and 2, in typical application, the system 1 is attached to the undercarriage of the vehicle 28, with the front discharge tubes 8 positioned over the respective front wheels 29 and the rear discharge tubes 9 positioned over the respective rear wheels 30 of the vehicle 28. This may be accomplished such as by, for example, attaching the mount brackets 3 (FIG. 2) of the pump and supply module 2 and the tube mount brackets 10 (FIG. 2) of the front discharge tubes 8 and rear discharge tubes 9 to the undercarriage of the vehicle 28.

Figure 7:
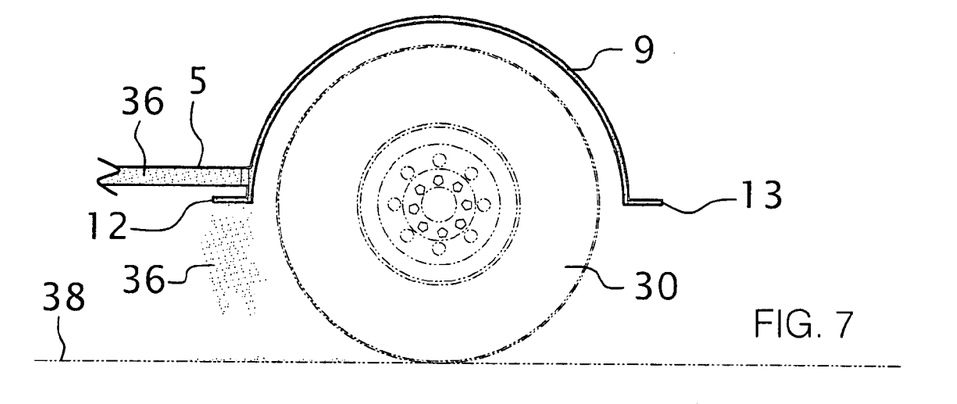
FIG. 7 is a side view of a rear wheel of a vehicle, illustrating use of the vehicle salt dispensing system in a forward drive mode.
Figure 8:
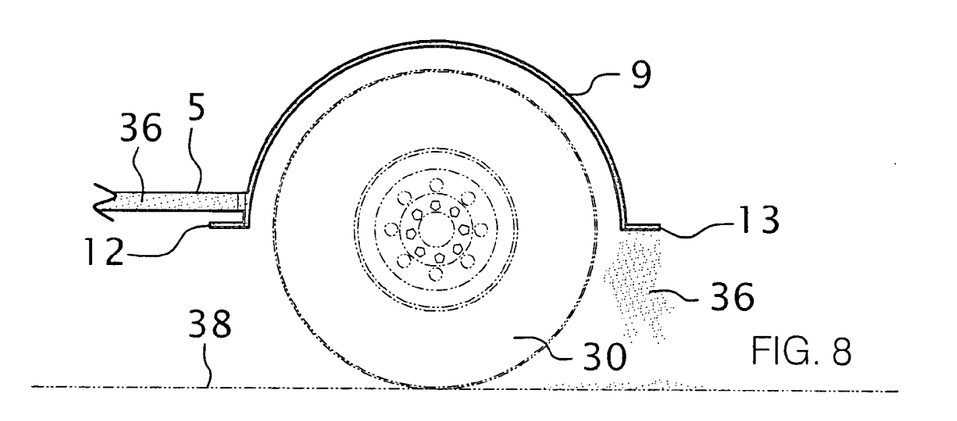
FIG. 8 is a side view of a rear wheel of a vehicle, illustrating use of the vehicle salt dispensing system in a reverse drive mode.
Figure 9:
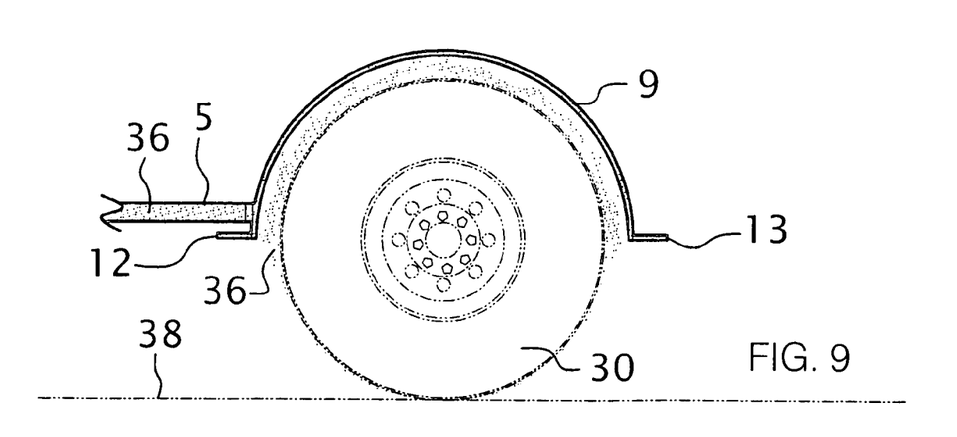
FIG. 9 is a side view of a rear wheel of a vehicle, illustrating use of the vehicle salt dispensing system in a normal drive mode.

Referring next to FIGS. 7-9 of the drawings, in typical use, the system 1 is capable of operation according to one of three different modes. These modes will be described with respect to operation of each rear discharge tube 9 and corresponding rear wheel 30 of the vehicle 28; however, operation is carried out in a similar manner with respect to each front discharge tube 8 and corresponding front wheel 29 of the vehicle 28. Each mode may be manually initiated by the operator of the vehicle 28 in the event that the ice sensor 11 indicates the presence of ice by illumination of the LED 24.

In a first mode, shown in FIG. 7, the system 1 facilitates the discharge or dispensing of salt 36 from the proximal flange 12 of each rear discharge tube 9 and onto icy pavement 38 in front of each rear wheel 30 when the vehicle 28 is to be driven from a stop position in a forward direction on the pavement 38. This may be accomplished by, for example, depressing the forward/override switch 22 to facilitate both operation of the pump and supply module 2 and opening of the gate 5c between the rear dispensing tube 5 and the forward drive channel 8c. This causes the pump and supply module 2 to pump salt 36 from the pump and supply module 2, through each rear dispensing tube 5 and into the forward drive channel 8c through the open gate 5c. Accordingly, the salt 36 is dispensed from the forward drive channel 8c through the openings (not shown) provided in the proximal flange 12 and onto the pavement 38, such that the salt 36 accumulates and melts ice in front of each rear wheel 30. This enhances traction of each rear wheel 30 on the pavement 38.

In a second mode, shown in FIG. 8, the system 1 facilitates the discharge or dispensing of salt 36 from the distal flange 13 of each rear discharge tube 9 and onto icy pavement 38 in the back of each rear wheel 30 when the vehicle 28 is to be driven from a stop position in a rearward direction on the pavement 38. This may be accomplished by, for example, depressing the reverse/override switch 20 to facilitate both operation of the pump and supply module 2 and opening of the gate 5b between the rear dispensing tube 5 and the reverse drive channel 8b. This causes the pump and supply module 2 to pump salt 36 from the pump and supply module 2, through each rear dispensing tube 5 and into the reverse drive channel 8b through the open gate 5b. Accordingly, the salt 36 is dispensed from the reverse drive channel 8b through the openings (not shown) provided in the distal flange 13 and onto the pavement 38, such that the salt 36 accumulates and melts ice in the back of each rear wheel 30. This enhances traction of each rear wheel 30 on the pavement 38.

In a third mode, shown in FIG. 9, the system 1 facilitates the discharge or dispensing of salt 36 from each rear discharge tube 9 and onto the corresponding rear wheel 30 as the vehicle 28 is in motion in a forward direction on the pavement 38. This may be accomplished by, for example, depressing the normal/override switch 21 to facilitate both operation of the pump and supply module 2 and opening of the gate 5a between the rear dispensing tube 5 and the normal drive channel 8a. This causes the pump and supply module 2 to pump salt 36 from the pump and supply module 2, through each rear dispensing tube 5 and into the normal drive channel 8a through the open gate 5a. Accordingly, the salt 36 is dispensed from the normal drive channel 8a through the openings (not shown) provided in the rear discharge tube 9 and onto the pavement 38, such that the salt 36 drops onto the rear wheel 30. This enhances traction of each rear wheel 30 on the pavement 38.

Figure 10:
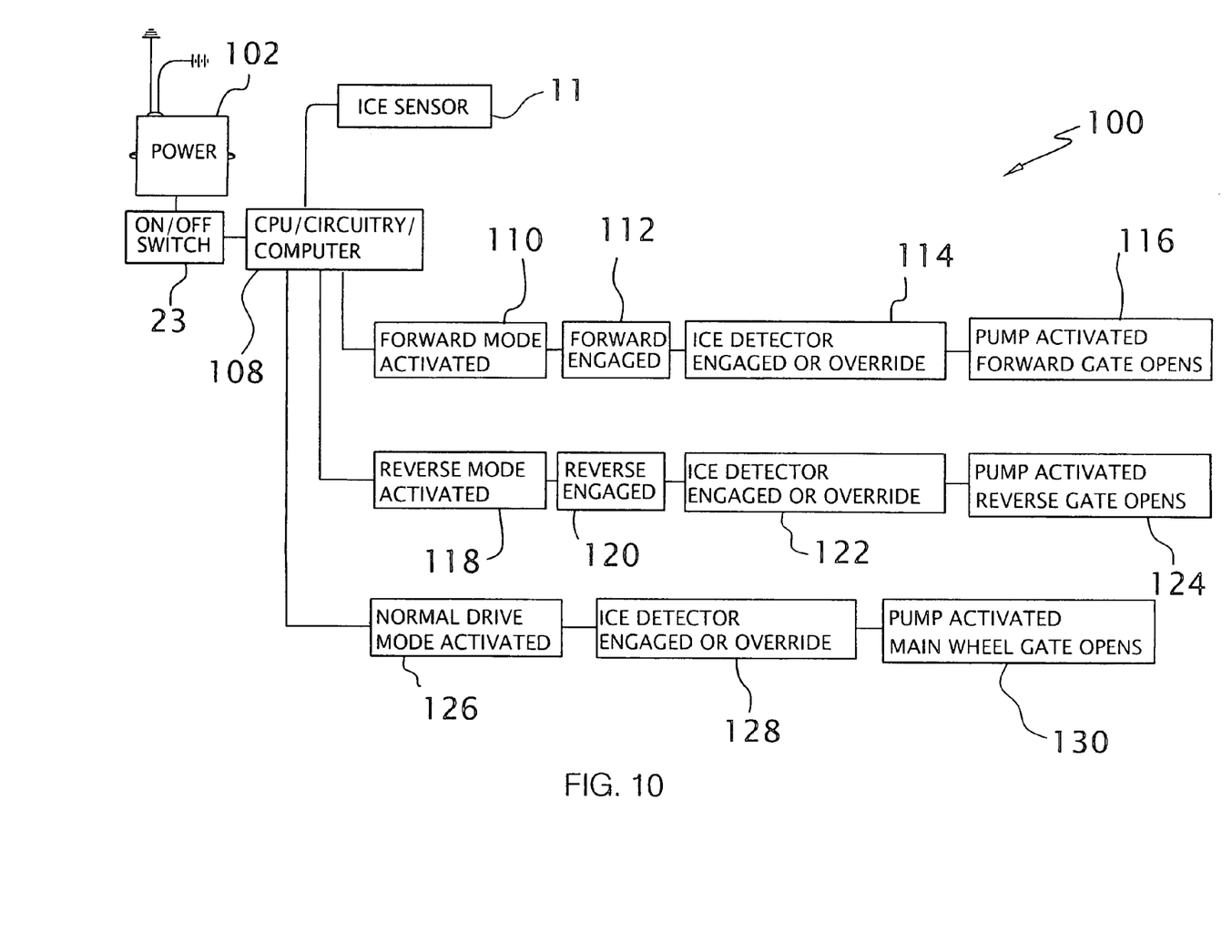
FIG. 10 is a block diagram illustrating typical operation of an illustrative embodiment of a vehicle salt dispensing system according to an override method of operation.

An alternative configuration for the system 1 is generally indicated by the block diagram 100 shown in FIG. 10. According to the block diagram 100, a power source 102, such as a battery 16, for example, is connected to the power switch 23 which is provided typically on the control module 14. The power switch 23 is connected to a CPU 108. In turn, the CPU 108 is connected to the pump and supply module 2 of the system 1. The ice sensor 11 on the pump and supply module 2 is also connected to the CPU 108.

In operation, a selected one of the reverse/override switch 20, the normal/override switch 21 or the forward/override switch 22 is set to the reverse, normal or forward operational position, respectively, of the system 1 to facilitate automatic dispensing of ice from the distal flange 13, the front rear discharge tube 8 or the distal flange 13 in the event that the ice sensor 11 senses the presence of ice. This is carried out, for example, in the event that there is a possibility of ice formation during cold weather and the operator of the vehicle 28 either leaves the vehicle 28 and therefore desires to ensure automatic salting of the rear wheels 30 by the respective rear discharge tubes 9 (and salting of the front wheels 29 by the respective front discharge tubes 8) in the forward or reverse modes, or desires to ensure automatic salting of the pavement 38 during driving of the vehicle 28 in the normal mode. Accordingly, in blocks 110, 112, 114 and 116, the ice sensor 11 detects the presence of ice and the system 1 is automatically operated in the forward mode shown in FIG. 7. In blocks 118, 120, 122 and 124, the ice sensor 11 detects the presence of ice and the system 1 is automatically operated in the reverse mode shown in FIG. 8. In blocks 126, 128 and 130, the ice sensor 11 detects the presence of ice and the system 1 is automatically operated according to the normal mode shown in FIG. 9. As the system 1 is operated in any of the forward, reverse or normal modes, the operational mode in progress can be selectively overridden by the user by appropriate manipulation of the reverse/override switch 20, the normal/override switch 21 or the forward/override switch 22 of the control module 14.

Figure 11:
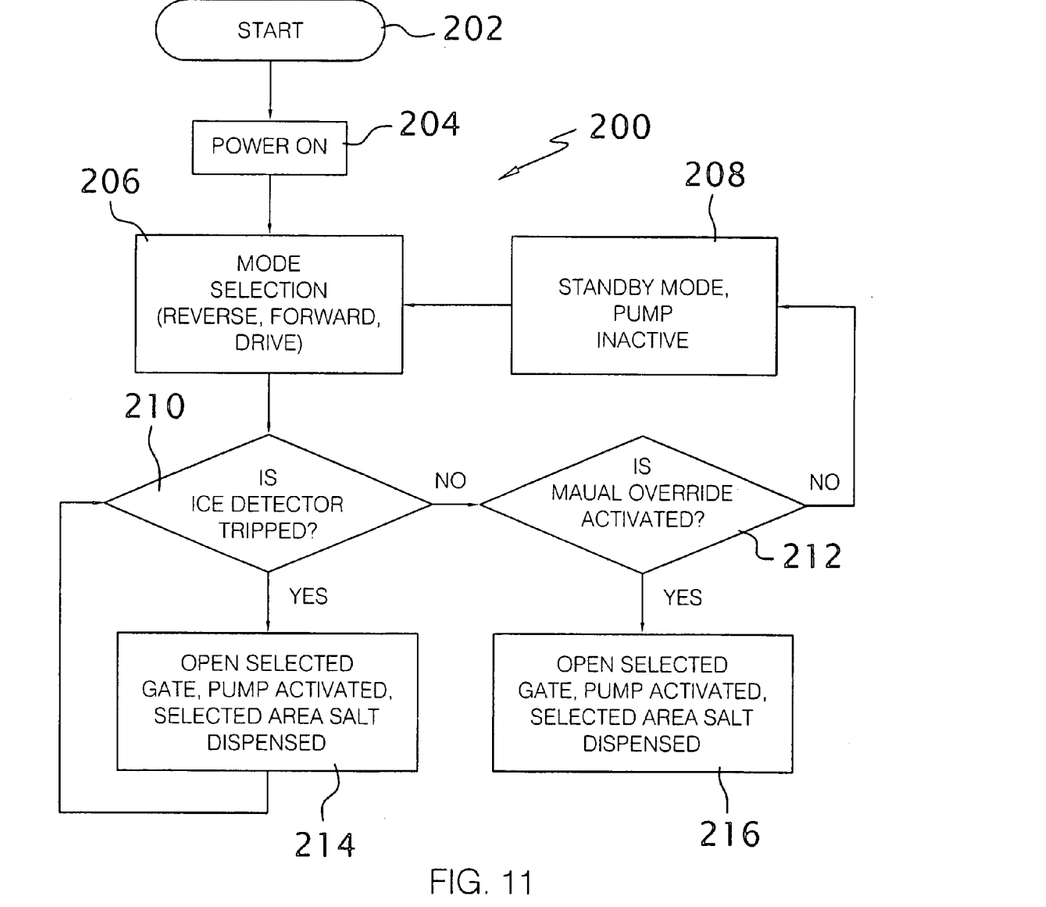
FIG. 11 is a flow diagram illustrating typical operation of an illustrative embodiment of a vehicle salt dispensing system.

A flow diagram 200 illustrating typical operation of the embodiment of the vehicle salt dispensing system which was heretofore described with respect to the block diagram 200 of FIG. 10 is shown in FIG. 11. The flow diagram 200 may be operational steps carried out by a software program suitable for operation of the system 1. The method is initiated in block 202 by initiating flow of electrical power to the system in step 204, typically by manipulation of the power switch 23. In block 206, the reverse, forward or normal operational mode of the system 1 is selected typically by manipulation of the reverse/override switch 20, normal/override switch 21 or forward/override switch 22, as appropriate. In block 208, the pump and supply module 2 remains in a standby mode. In block 210, in the event that the ice sensor 11 detects ice, the system is operated in block 214 according to the forward mode, the reverse mode or the normal mode selected in step 206. In the event that the ice sensor 11 does not detect ice and the manual override is not activated, the pump and supply module 2 remains in standby mode in block 208. In the event that in block 212 the ice sensor 11 does not detect ice and the manual override is activated, the system is operated in block 216 according to the forward mode, the reverse mode or the normal mode selected in step 206.

While the preferred embodiments of the invention have been described above, it will be recognized and understood that various modifications can be made in the invention and the appended claims are intended to cover all such modifications which may fall within the spirit and scope of the invention.

What is claimed is:

1. A vehicle salt dispensing system, comprising,
   a pump and supply module adapted to contain a supply of salt;
   at least one dispensing tube communicating with said pump and supply module;
   at least one generally curved discharge tube communicating with said at least one dispensing tube; and
   an ice sensor provided on said pump and supply module and adapted to operate said pump and supply module upon detecting ice.

2. The system of claim 1 wherein said at least one dispensing tube comprises a plurality of dispensing tubes and said at least one discharge tube comprises a plurality of discharge tubes.

3. The system of claim 2 wherein said plurality of dispensing tubes comprises a pair of spaced-apart front dispensing tubes and a pair of spaced-apart rear dispensing tubes and said plurality of discharge tubes comprises a pair of front discharge tubes and a pair of rear discharge tubes communicating with said pair of front dispensing tubes and said pair of rear dispensing tubes, respectively.

4. The system of claim 1 wherein said at least one discharge tube comprises at least two drive channels and further comprising at least two gates between said at least one generally curved discharge tube and said at least two drive channels, respectively.

5. The system of claim 4 wherein said at least two drive channels comprises a first drive channel, a second drive channel spaced-apart from said first drive channel and a third drive channel between said first drive channel and said second drive channel, and wherein said at least two gates comprises a first gate between said at least one discharge tube and said first drive channel, a second gate between said at least one discharge tube and said second drive channel and a third gate between said at least one discharge tube and said third drive channel.

6. The system of claim 5 wherein said first drive channel discharges at a first end of said dispensing tube, said second drive channel discharges at a second end of said dispensing tube and said third drive channel discharges between said first end and said second end of said dispensing tube.

7. The system of claim 1 further comprising a refill tube connected to said pump and supply module.

8. A vehicle salt dispensing system, comprising:
   a pump and supply module adapted to contain a supply of salt;
   at least one dispensing tube communicating with said pump and supply module, said at least one dispensing tube having a proximal flange and a distal flange spaced-apart with respect to said proximal flange;
   at least one generally curved discharge tube communicating with said at least one dispensing tube; and
   an ice sensor provided on said pump and supply module and adapted to operate said pump and supply module upon detecting ice.

9. The system of claim 8 wherein said at least one dispensing tube comprises a plurality of dispensing tubes and said at least one discharge tube comprises a plurality of discharge tubes.

10. The system of claim 9 wherein said plurality of dispensing tubes comprises a pair of spaced-apart front dispensing tubes and a pair of spaced-apart rear dispensing tubes and said plurality of discharge tubes comprises a pair of front discharge tubes and a pair of rear discharge tubes communicating with said pair of front dispensing tubes and said pair of rear dispensing tubes, respectively.

11. The system of claim 8 wherein said at least one discharge tube comprises at least two drive channels and further comprising at least two gates between said at least one general curved discharge tube and said at least two drive channels, respectively.

12. The system of claim 11 wherein said at least two drive channels comprises a first drive channel, a second drive channel spaced-apart from said first drive channel and a third drive channel between said first drive channel and said second drive channel, and wherein said at least two gates comprises a first gate between said at least one discharge tube and said first drive channel, a second gate between said at least one discharge tube and said second drive channel and a third gate between said at least one discharge tube and said third drive channel.

13. The system of claim 12 wherein said first drive channel discharges at said proximal flange of said dispensing tube, said second drive channel discharges at said distal flange of said dispensing tube and said third drive channel discharges between said proximal flange and said distal flange of said dispensing tube.

14. The system of claim 8 further comprising a refill tube connected to said pump and supply module.

* * * * *